United States Patent
Arastafar

(10) Patent No.: US 8,688,362 B2
(45) Date of Patent: Apr. 1, 2014

(54) CHANGING FREQUENCY OF NAVIGATIONAL NOTIFICATIONS BASED ON TRAVEL PATTERNS

(75) Inventor: Martin Arastafar, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 406 days.

(21) Appl. No.: 12/970,223

(22) Filed: Dec. 16, 2010

(65) Prior Publication Data

US 2012/0158283 A1    Jun. 21, 2012

(51) Int. Cl.
*G06F 19/00* (2011.01)
*G06G 7/70* (2006.01)
*G06G 7/76* (2006.01)
*G05D 1/02* (2006.01)

(52) U.S. Cl.
USPC ............ 701/118; 701/117; 701/119; 701/300

(58) Field of Classification Search
USPC ......... 701/201, 400, 408, 409, 117, 118, 119, 701/300
See application file for complete search history.

(56) References Cited

U.S. PATENT DOCUMENTS

| | | | | |
|---|---|---|---|---|
| 6,308,133 | B1* | 10/2001 | Loffert et al. ................. | 701/428 |
| 6,622,087 | B2* | 9/2003 | Anderson ...................... | 701/423 |
| 7,197,394 | B2* | 3/2007 | Ohler ............................ | 701/423 |
| 7,280,913 | B2* | 10/2007 | Ruschkowski ............... | 701/488 |
| 7,289,904 | B2* | 10/2007 | Uyeki ........................... | 701/533 |
| 7,363,357 | B2* | 4/2008 | Parupudi et al. ............. | 709/220 |
| 7,512,487 | B1* | 3/2009 | Golding et al. .............. | 701/424 |
| 7,680,749 | B1* | 3/2010 | Golding et al. ................. | 706/14 |
| 2004/0236505 | A1* | 11/2004 | Entenmann et al. .......... | 701/208 |
| 2005/0216185 | A1* | 9/2005 | Takezaki et al. .............. | 701/200 |
| 2006/0069500 | A1 | 3/2006 | Hashizume | |
| 2006/0167626 | A1* | 7/2006 | Hashizume ................... | 701/210 |
| 2009/0271101 | A1* | 10/2009 | Relyea et al. ................. | 701/118 |

FOREIGN PATENT DOCUMENTS

| | | |
|---|---|---|
| EP | 1233389 A2 | 8/2002 |
| JP | 2005121382 A | 5/2005 |
| WO | 2006032962 A1 | 3/2006 |
| WO | 2010040385 A1 | 4/2010 |
| WO | 2010040387 A1 | 4/2010 |

OTHER PUBLICATIONS

European Search Report from corresponding EP Application dated May 23, 2011.
"BMW developing artificially intelligent navigation", Mar. 3, 2009, http://reviews.cnet.com/8301-13746_7-10187501-48.html.
Garmin Nuvi GPS units http://gpsmagazine.com/2007/02/garmin_nuvi_680_indepth_review.php?page=15, Feb. 7, 2007.

(Continued)

Primary Examiner — Thomas Black
Assistant Examiner — Tyler Paige
(74) Attorney, Agent, or Firm — Gowlings Lafleur Henderson LLP

(57) ABSTRACT

A navigation-enabled device has a memory operatively coupled to a processor for executing a navigation application, a speaker operatively coupled to the processor for providing navigational notifications, and a position-determining system for determining a current location to enable the processor to identify a current route on which the device is located. The processor is configured to determine whether the current route is a familiar path and vary a frequency of the navigational notifications based on whether the current route is a familiar path.

17 Claims, 13 Drawing Sheets

(56) References Cited

OTHER PUBLICATIONS

Tom Tom Go 720 GPS unit http://www.gpsmagazine.com/2007/09/tomtom_go_720_review.php?page=4, Sep. 3, 2007.

Kaori Kobayashi—Lost again on the way? Measuring Human Map-Reading Ability, Mar. 2010 DBSJ Journal 8 No. 4.

Kristin L Lovelace—Elements of Good Route Directions in Familiar and Unfamiliar Environments, Dec. 6, 2010.

Kayur Patel—Personalizing Routes, Oct. 15-18, 2006.

* cited by examiner

CHANGING FREQUENCY OF NAVIGATIONAL NOTIFICATIONS BASED ON TRAVEL PATTERNS

CROSS-REFERENCE TO RELATED APPLICATIONS

This is the first application filed for the present technology.

TECHNICAL FIELD

The present technology relates to GPS-enabled navigation devices and, in particular, to the audible and visual notifications provided by such devices.

BACKGROUND

Dedicated GPS navigation units and GPS-enabled mobile devices that run navigation applications are increasingly popular. These devices typically have a display screen and a speaker for providing visual and audible navigation instructions (also referred to herein as navigational notifications). These instructions or notifications inform the user of approaching turns, intersections, exits, points of interest, or other map features of relevance to the user of the device. For example, a highlighted path and/or directional arrow may indicate visually where the user is to turn. Typically, accompanying this visual cue is an audible notification (text-to-speech message) that also alerts the user of the upcoming turn such as, for example, "Turn right in 100 meters onto Columbia Street". This audible notification is delivered a predetermined distance or time before the device is due to arrive at the intersection to allow sufficient time for the user to react safely to the instruction. Most devices also repeat the notification as the device reaches the intersection, e.g. "Turn right now onto Columbia Street".

On conventional navigation devices, the frequency of these notifications may be changed in the user settings. Thus, the user may manually increase or decrease the frequency with which these notifications are provided. The user settings may also permit the audible notifications to be disabled altogether.

One drawback of the conventional technology is that the frequency of the notifications can only be changed by reconfiguring the user settings. This requires that the user enter the settings menu, locate the notification setting, and make the desired adjustment. Because of the complexity of this manual adjustment procedure, it is not feasible for a driver to do so while driving. Thus, once underway, it is not practical for the driver to modify the frequency of the notifications. Instead, the driver must remember to make this adjustment prior to traveling, or he must pull over to make the change, both of which are highly inconvenient. Moreover, if the driver does not know with certainty which route he will take, he will not necessarily know ahead of time whether he will require more frequent or less frequent notifications.

Accordingly, there is a need to provide an improved method and device for controlling the frequency of navigational notifications.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

In general, the present technology pertains to an innovative technique for automatically varying the frequency with which a navigation device provides navigational notifications. The device varies the frequency of notifications based on the whether the current route over which the device is traveling is a familiar path to the user of the device. Where the device infers that the current route is a familiar path, the frequency of the notifications is diminished. Where the device infers that the current route is not a familiar route, the frequency of the notifications is increased. The device may furthermore take into account other factors, such as a weather data, road condition data, and/or traffic data to further adjust the frequency of these notifications.

Thus, a main aspect of the present technology is a method of providing navigational notifications. The method entails identifying a current route, determining whether the current route is a familiar path, and varying a frequency of the navigational notifications based on whether the current route is a familiar path.

Another main aspect of the present technology is a computer readable medium (or machine readable medium) comprising instructions in code which when loaded into memory and executed on a processor of a navigation-enabled device, such as a GPS-enabled mobile device or a dedicated GPS navigation unit, causes the steps of the foregoing method to be performed.

Yet another main aspect of the present technology is a navigation-enabled device or GPS-enabled device (e.g. GPS-enabled mobile device, dedicated GPS navigation unit, or equivalent) that has a memory operatively coupled to a processor for executing a navigation application, a speaker operatively coupled to the processor for providing navigational notifications, and a position-determining system for determining a current location to enable the processor to identify a current route on which the device is located. The processor is configured to determine whether the current route is a familiar path and vary a frequency of the navigational notifications based on whether the current route is a familiar path.

The details and particulars of these aspects of the technology will now be described below, by way of example, with reference to the attached drawings.

Figure 1A:
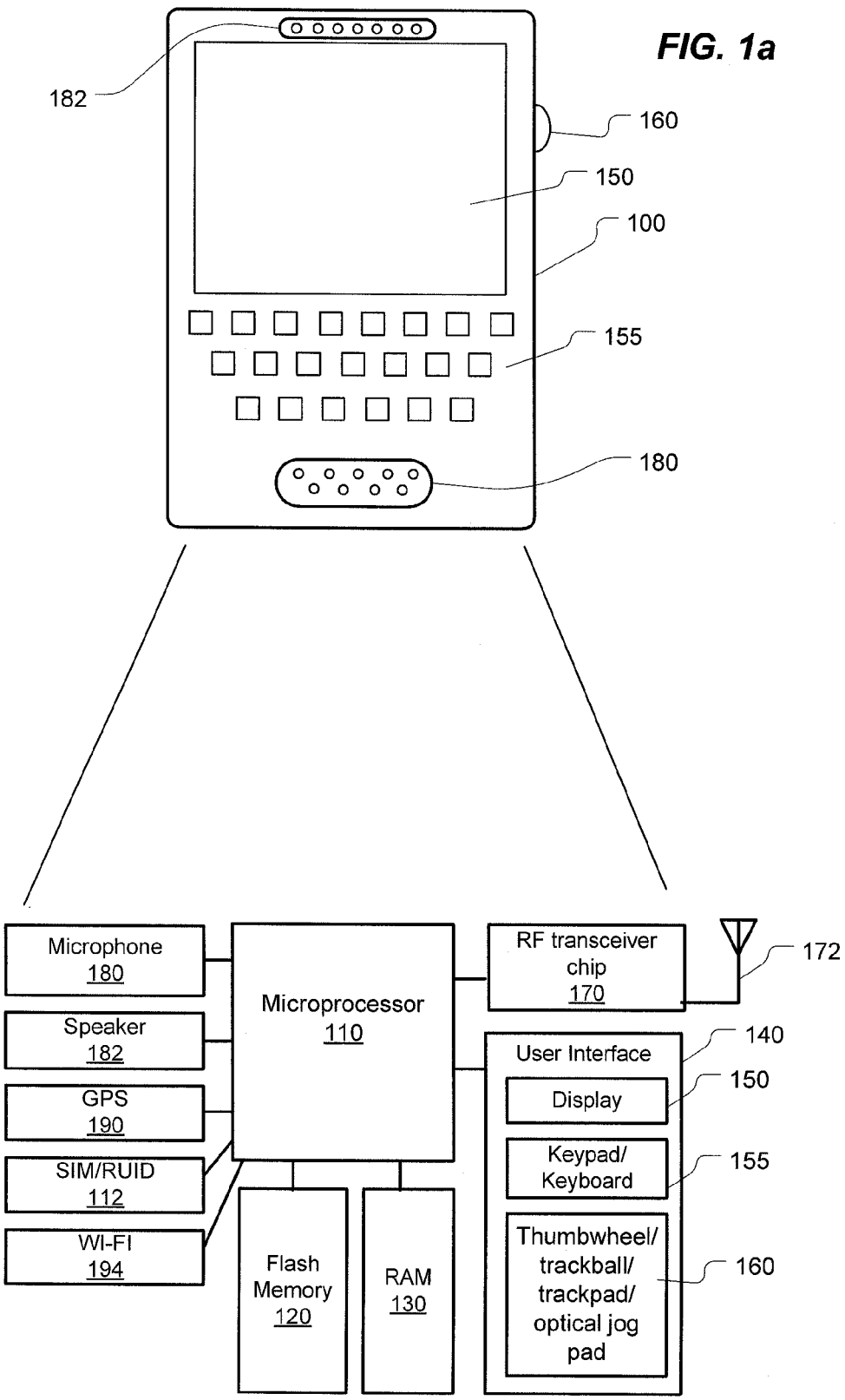
FIG. 1 is a schematic depiction of a GPS-enabled mobile device on which the present technology may be implemented.
Figure 1B:
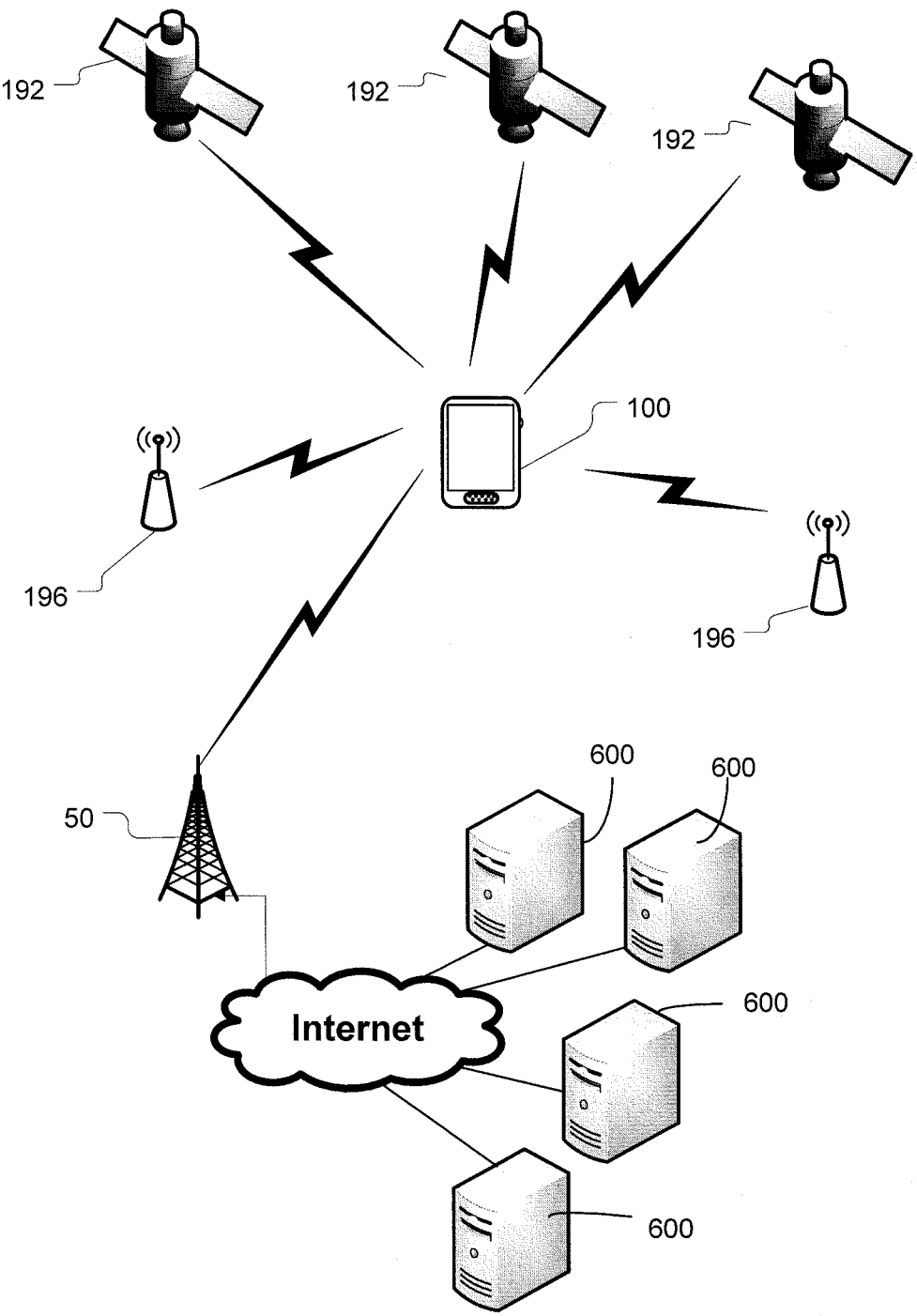

FIG. 1 is a schematic depiction of a wireless communications device 100 as one example of a portable electronic device or mobile device on which the present technology can be implemented. The terms "mobile device" or "wireless communications device" are meant to encompass a broad range of cellular or other portable electronic devices such as, for example, smart phones, cell phones, satellite phones, wireless-enabled personal digital assistants (PDAs), wireless-enabled computing tablets, wireless-enabled laptops, etc.

As shown schematically in FIG. 1, the wireless communications device or mobile device 100 includes a microprocessor (referred to herein as a "processor") 110 operatively coupled to memory (Flash Memory 120 and/or RAM 130). The processor and memory cooperate to execute a navigation application on the device. The device may include a SIM card 112, RUID card or equivalent. The device 100 has a user interface 140 which includes a display (e.g. an LCD screen) 150, e.g. for displaying maps for navigation, a keyboard/keypad 155, e.g. for entering destination information into the navigation application. A thumbwheel (or trackball or track pad or optical jog pad) 160 may optionally be provided as part of the user interface. Alternatively, the user interface 140 may include a touch screen in lieu of a keyboard/keypad. The wireless communications device 100 includes a radiofrequency (RF) transceiver chipset 170 for wirelessly transmitting and receiving data and voice communications, e.g. via a cellular network. The wireless communications may be performed using CDMA, GSM, or any other suitable communications standard or protocol. A microphone 180 and speaker 182 (and/or jack for earphones) are provided for voice communications. The speaker 182 also serves to provide audible navigation instructions (notifications) for the navigation application.

As further depicted in FIG. 1, the wireless communications device or mobile device 100 may include a GPS chipset 190 (or other position-determining subsystem) to determine the current location of the device from radiofrequency signals emitted by a plurality of orbiting GPS satellites. The GPS chipset 190 or other position-determining subsystem provides location and speed data to the navigation application using techniques that are well known in the art.

Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of position-determining subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Radiolocation techniques may also be used in conjunction with GPS in a hybrid positioning system.

References herein to "GPS" are meant to include Assisted GPS and Aided GPS.

To summarize, the navigation-enabled device 100 has its memory 120, 130 operatively coupled to its processor 110 for executing a navigation application. The speaker 182 is also operatively coupled to the processor 110 to provide audible navigational notifications. The GPS receiver 190 (or other position-determining system) determines a current location of the device 100 to enable the processor 110 to identify a current route on which the device 100 is located. The processor 110 is configured to determine whether the current route is a familiar path. The processor 110 is configured to vary a frequency of the navigational notifications based on whether the current route is a familiar path. If the current route is indeed a familiar path, the frequency of notifications is decreased. Conversely, if the current route is an unfamiliar path, the frequency of notifications is increased.

In one specific implementation, the radiofrequency transceiver 170 is used to receive weather data, road condition data and/or traffic data. This additional data may be used to refine (or further adjust) the notification frequency. For example, if the weather and/or road conditions are poor, the frequency of notifications may be increased. Likewise, if traffic data suggests that there is heavy but fast-moving traffic, the frequency of notifications may be increased. Other factors that may be used to modify the notification frequency include time of day (whether it is daytime or night-time) and any historical accident/collision data for a given route segment.

Figure 2A:
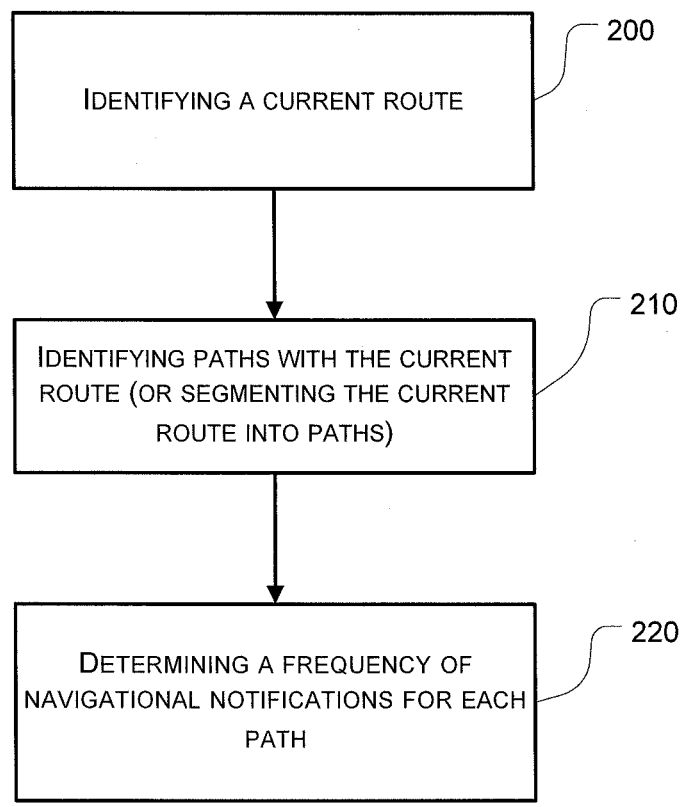
FIG. 2 is a flowchart depicting steps of a method of providing navigational notifications in accordance with an aspect of the technology.
Figure 2B:
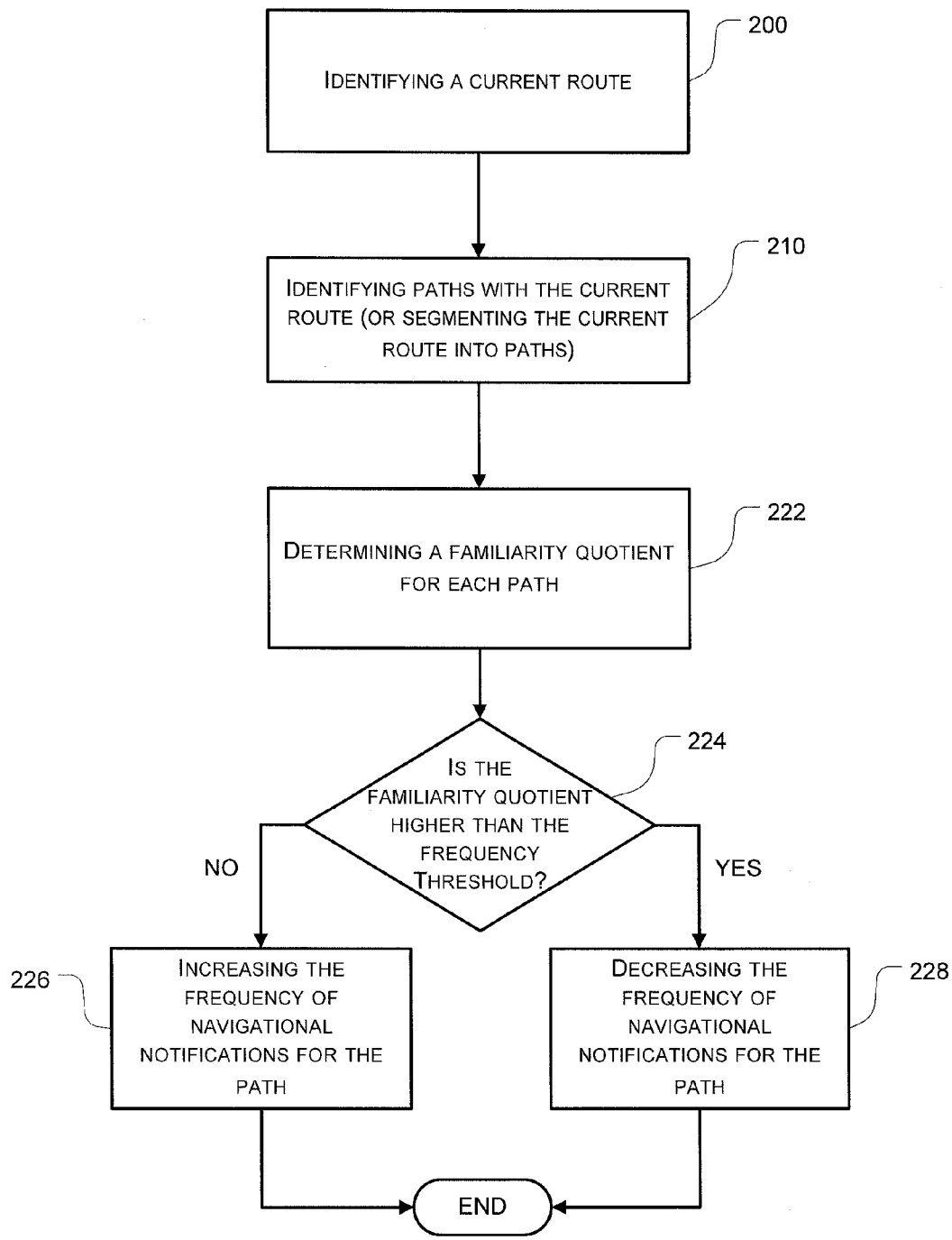

Another aspect of the present technology is a novel method of providing navigational notifications. Main step of this method are depicted in the flowchart shown in FIG. 2. The method entails a step 200 of identifying a current route. A subsequent step 210 of this method involves determining whether the current route is a familiar path. Once the determination is made as to the familiarity of the route, a frequency of the navigational notifications is varied (step 220) based on whether the current route is a familiar path or not.

Figure 3:
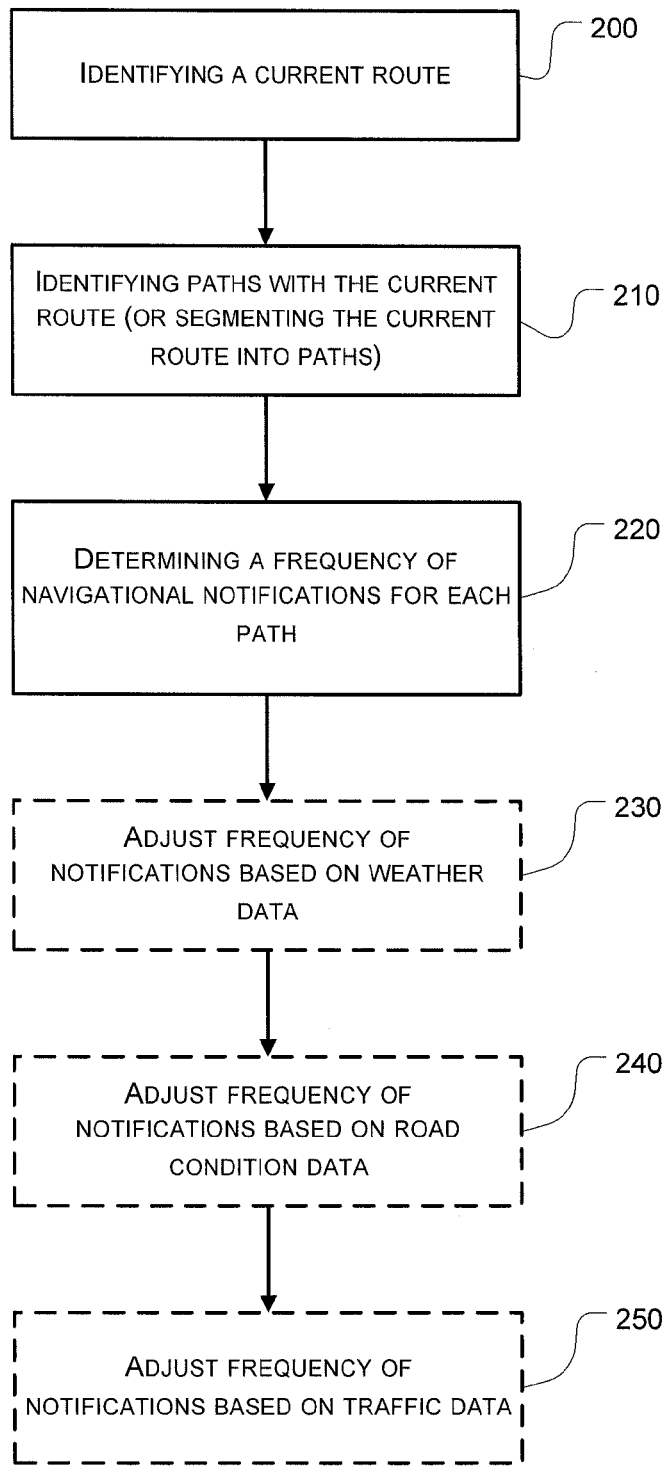
FIG. 3 is a flowchart depicting additional optional steps of the method of FIG. 2.

In a variant of this novel method, other factors such as weather, road conditions and traffic may be used to further adjust the frequency of the notifications. FIG. 3 depicts a flowchart in which further optional steps 230, 240 and 250 may be performed. For example, at optional step 230, the frequency of the notifications may be further adjusted based on weather data received by the device. As another example, at optional step 240, the frequency of the notifications may be further adjusted based on road condition data received by the device. As yet a further example, at optional step 250, the frequency of the notifications may be further adjusted based on traffic data received by the device. As will be appreciated, all or a subset of these factors (weather, road conditions and traffic) may optionally be used to further adjust the frequency of the notifications.

In another implementation of this novel method, the frequency of the notifications may be further adjusted or overridden by a voice command or other user input. For example, the method may entail receiving a voice command and then adjusting the frequency of the navigational notifications based on the voice command. This feature might be useful where the user wishes to override the automatically variation of the notification frequency, for example in a case where he is traveling with a companion who knows the route very well.

In another implementation of this novel method, the step of determining whether the current route is a familiar path comprises a prior step of learning travel patterns. Learning travel patterns enables the device to remember which routes the device has frequently taken. For example, the device would quickly learn a route from home to work. This route would be classified as familiar. Subsequent travel over that route would result in the device decreasing the frequency of notifications.

In one specific implementation, learning travel patterns may involve storing a list of routes or route segments over which the device has traveled, storing a number of times the device has traveled each of the routes or route segments, and storing dates when the routes or route segments were traveled. This enables the device to compute a route familiarity quotient based on the number of times a route or route segment was traveled and how long ago the route or route segment was traveled. Conceptually, the quotient may be determined by dividing the number of trips by the average age of the trips. Thus, for example, if the user made many recent trips, the quotient will be high. If a route was travelled frequently but many years ago, the route might no longer be familiar. The quotient (number of trips divided by average age) would thus be lower, suggesting decreased familiarity. Thus, the elapsed time since a given route was taken and the number of trips along that given route effectively provide a weighting (or quotient) that reflects the user's familiarity with that given route. This route familiarity quotient is then compared to a predetermined threshold to determine whether the route is to be classified as familiar or unfamiliar. For example, a route may have been traveled ten times once a year for ten years. The average age of being five years, the quotient would be 2. The threshold for familiarity may be set at 5. This route would thus be classified as unfamiliar. As another example, assume a route was traveled three times an average of six months ago. The quotient would thus be 6, which is greater than the threshold of 5, thus indicating that the route should be classified as familiar. As will be appreciated, the device may have different gradations of familiarity as opposed to a binary (familiar-unfamiliar) classification. It bears emphasis that the quotient is merely presented as one example of a simple mathematical way of evaluating familiarity. It will be appreciated that many other algorithms may be devised to quantify a user's familiarity with a given route.

In another implementation of this novel method, the determination as to whether the current route is a familiar path is accomplished by determining whether the device is located in a familiar geographical area, e.g. a familiar neighbourhood, a familiar city, a familiar country, etc. In other words, the device may make a quick assumption about the familiarity or unfamiliarity of a given route by simply determining the geographical entity in which the device is currently situated. For example, if the device is currently situated in the user's home town or in a region associated with the mobile device's home area code, then the device may surmise that the current route is likely to be a familiar path. If the device is traveling in a geographical area that is foreign to the user, e.g. a foreign country, a distant city, etc., then the device may presume that the current route is likely to be unfamiliar to the user. In a variant, the device may increase the notification frequency if the device is traveling in a geographical region that has street signs in a language that is foreign to the user's language (i.e. the language setting on the device or the language associated with the user's home region). Using the geographical entity as an indicator of familiarity may be used in addition to any learned travel patterns or in lieu thereof.

The foregoing method steps can be implemented in hardware, software, firmware or as any suitable combination thereof. That is, the computer-readable medium comprises instructions in code which when loaded into memory and executed on a processor of a mobile device is adapted to perform acts of defining a trusted group of mobile devices traveling to a common destination, obtaining traffic data from the mobile devices of the trusted group, and determining traffic information based on the traffic data for a plurality of routes to the common destination.

These method steps may be implemented as software, i.e. as coded instructions stored on a computer readable medium which performs the foregoing steps when the computer readable medium is loaded into memory and executed by the microprocessor of the mobile device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

Figure 4:
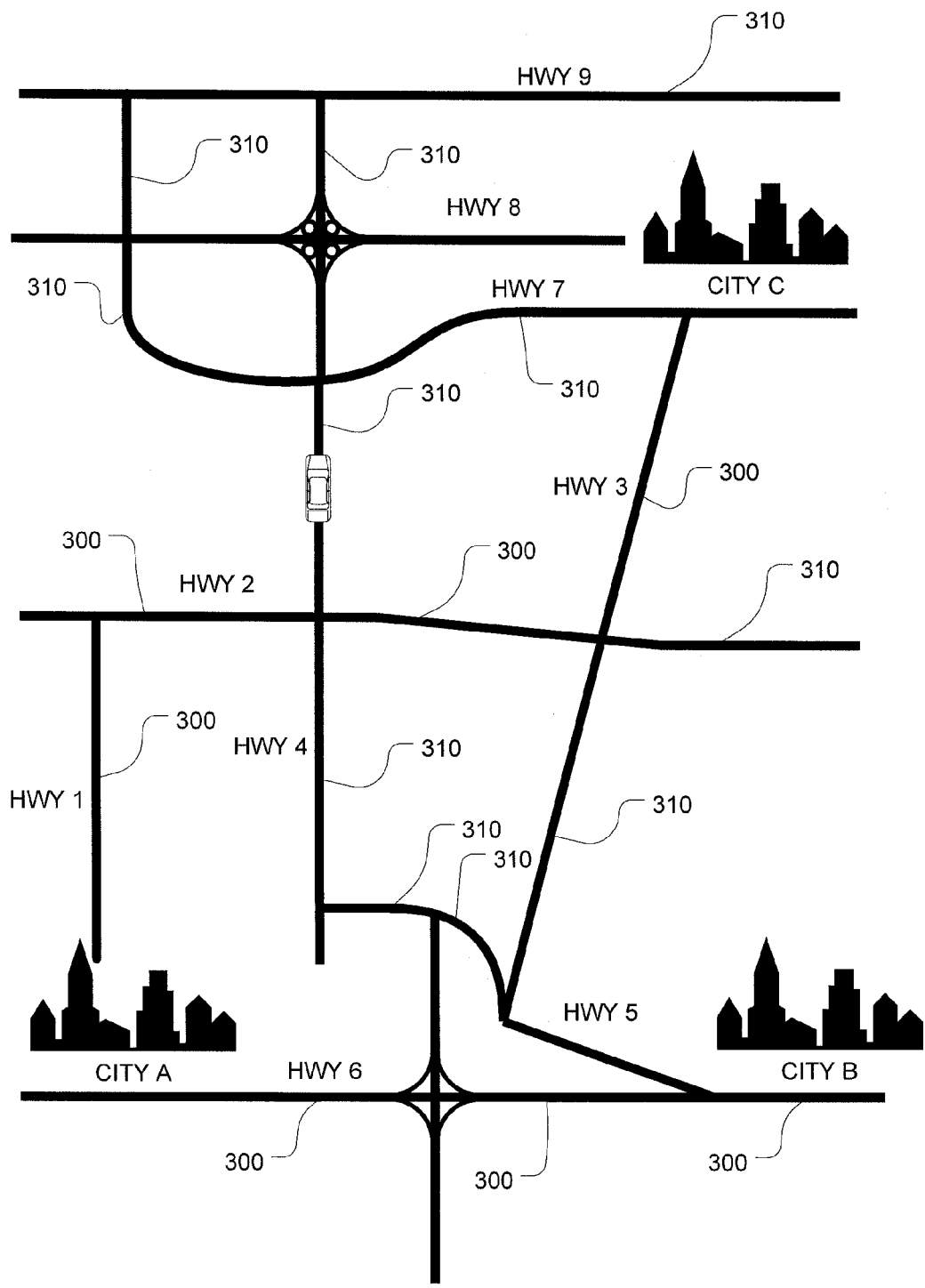
FIG. 4 depicts an example of a road map in which certain routes are classified as familiar and others classified as unfamiliar for the purposes of illustrating how the novel technology may be used to vary the frequency of navigational notifications.
Figure 5:
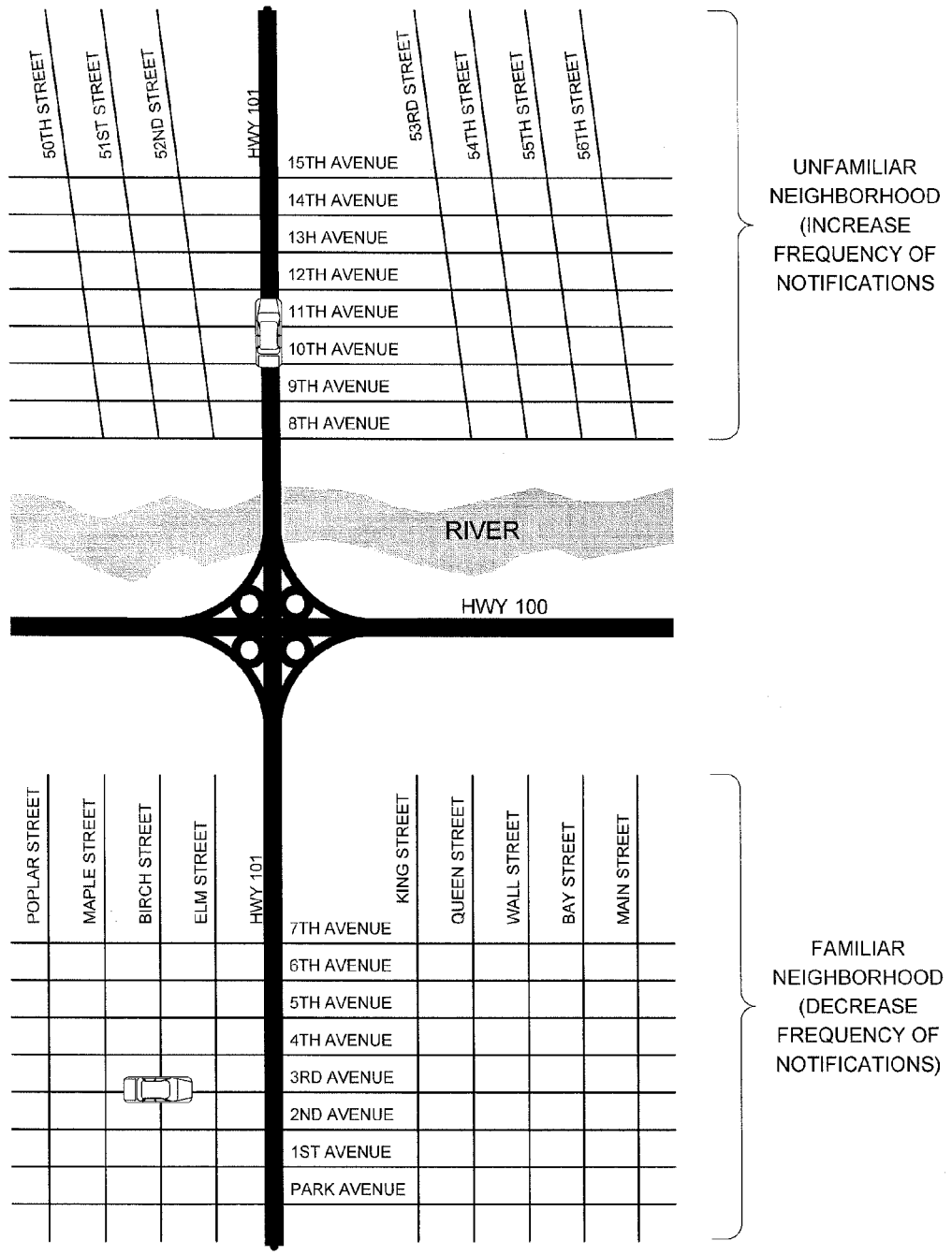
FIG. 5 depicts an example of a city map in which certain neighbourhoods are classified as familiar and others classified as unfamiliar for the purposes of illustrating another way in which this novel technology may be used to vary the frequency of navigational notifications.

FIGS. 4 and 5 illustrate further examples of how this technology may be implemented to vary or adjust the frequency of navigational notifications based on the familiarity of a given path or geographical region.

FIG. 4 depicts an example of a road map in which certain routes are classified as familiar (familiar paths 300) and other routes are classified as unfamiliar (unfamiliar paths 310). In one implementation, the routes are divided into route segments because a user may only be familiar with certain segments of a route. In this example, the user commutes frequently between City A and City B. The user typically takes the direct route between City A and City B (along Highway 6). The route along Highway 6 is thus designated as familiar (labelled as familiar path 300). Alternatively, the three route segments along Highway 6 may be labelled as familiar path segments 300. The user also frequently commutes between City A and City C by taking Highway 1, Highway 2, and Highway 3. This route (and its constituent route segments) is thus also designated as a familiar path 300. For the sake of illustration, it is assumed that none of the other routes or route segments are familiar to the user. These are thus designated as unfamiliar paths 310. Using the present technology, therefore, when the user travels along a route (or route segment) that is classified (designated) as a familiar path 300, the frequency of notifications is automatically decreased. Conversely, when the user travels along a route (or route segment) that is classified (designated) as an unfamiliar path 310, the frequency of notifications is automatically increased. In the specific example depicted in FIG. 4, the car icon (representing by way of example a current location of the navigation-enabled device) is traveling along a segment of Highway 4 between Highway 2 and Highway 7. This route segment is classified as an unfamiliar path 310. Accordingly, the device automatically increases the notification frequency to provide more frequent navigation instructions to the user of the device. The a priori classification of routes as familiar or unfamiliar may be accomplished, as noted above, by learning travel patterns for the device.

FIG. 5 depicts an example of how the familiarity of a given route may be inferred or deduced by referring to the neighbourhood, city, district or other geographical entity in which the device is currently situated. Determining familiarity based on the user's general familiarity with a particular geographical entity or region obviates the need to collect travel data and determine travel patterns. In one example, which is presented in FIG. 5, a user may be familiar with one neighbourhood in a large city but unfamiliar with another neighbourhood in the same large city. A city map of a fictitious city is depicted in FIG. 5 for the purposes of illustrating this particular implementation.

In this example, the neighbourhood south of the river and highway is classified as familiar whereas the neighbourhood north of the river and highway is classified as unfamiliar. When the device is located in the familiar neighbourhood, the device infers or assumes that the user is probably familiar with the routes in that neighbourhood. The device then automatically decreases the notification frequency. Conversely, when the device is located in the unfamiliar neighbourhood, the device infers or assumes that the user is probably unfamiliar with the routes in that neighbourhood. The device then automatically increases the notification frequency.

FIGS. 6 to 10 illustrate the operation of an exemplary mobile device 100 that is running a navigation application in accordance with implementations of the present technology. The user interface (or map interface) 400 is displayed onscreen in the conventional manner with street names and other map features labelled accordingly. The current location 410 may be shown using any suitable icon or graphical indicator. The navigation application may provide a visual notification and/or an audible notification. An example of a visual notification is a turn arrow 420 (and/or a highlighted path) which may be depicted onscreen to visually indicate to the user where he should turn. Another example of a visual notification is a textual notification 430 providing written instructions to the user. The audible notification may be provided, for example, by a text-to-speech module that reads the written instructions aloud for the user to hear. Audible instructions are generally believed to reduce driver fatigue since they permit the driver to keep his eyes on the road while listening to the instructions.

Optionally, the user interface may provide a familiarity indicator 440 to indicate to the user whether the device is currently configured to provide an increased or decreased frequency of notifications. This may be useful to the user so that the user may manually override the automatic setting, as will be explained in greater detail below.

Optionally, the user interface may provide a user interface element 450 to manually change (or override) the frequency of the navigational notifications. For example, the device may infer that the user is familiar with a given neighbourhood and thus decrease the notifications. The user may wish to override this assumption if he is traveling along a route in that neighbourhood with which he is, in fact, unfamiliar. In a variant, the ability to override the automatically adjusted frequency of notifications may be triggered and controlled by a voice command.

Figure 6:
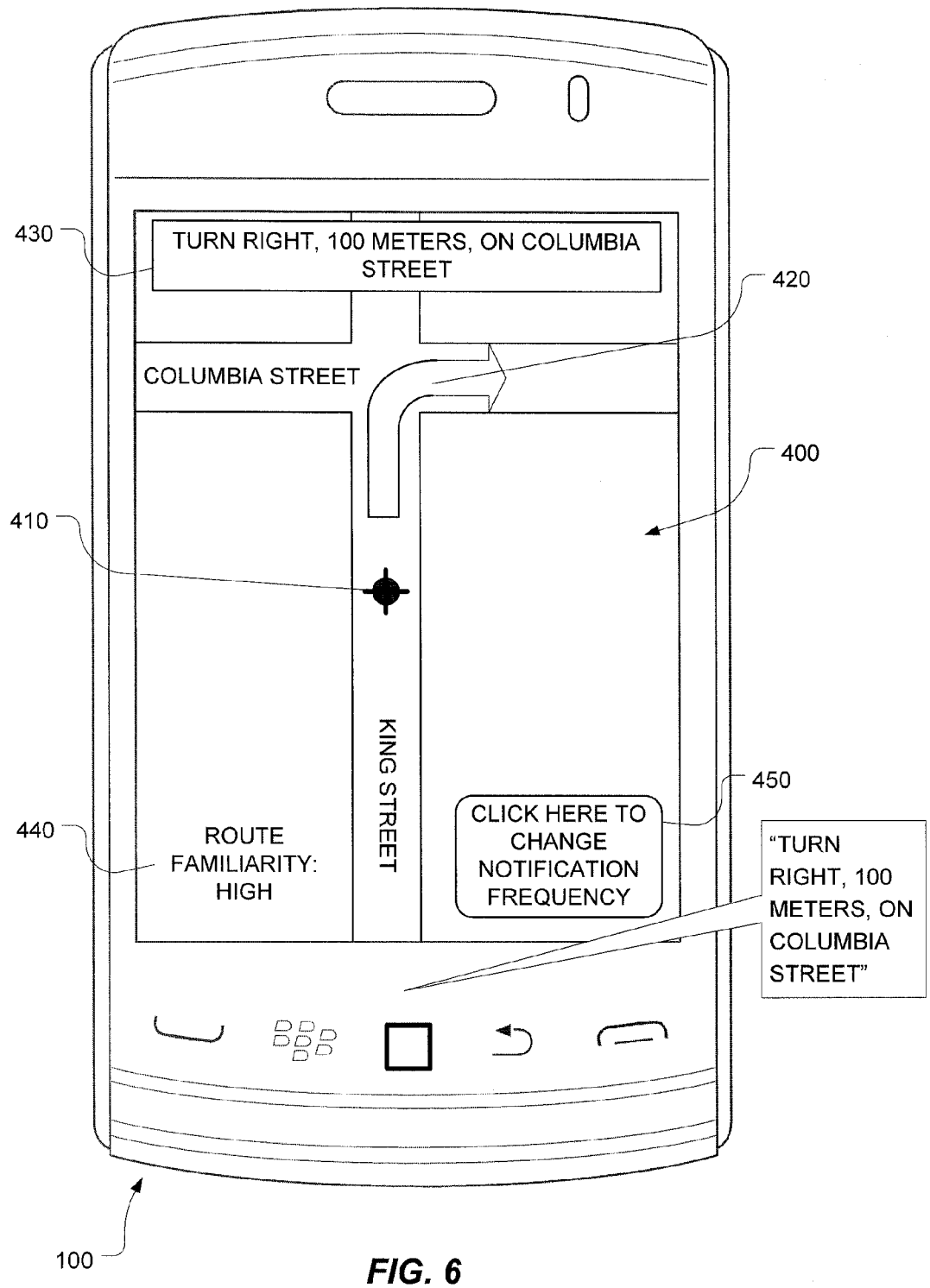
FIG. 6 depicts an example of a navigation application executing on a mobile device traveling along a familiar path in which case the device provides, by way of example, only one advance notification of an upcoming turn.
Figure 7:
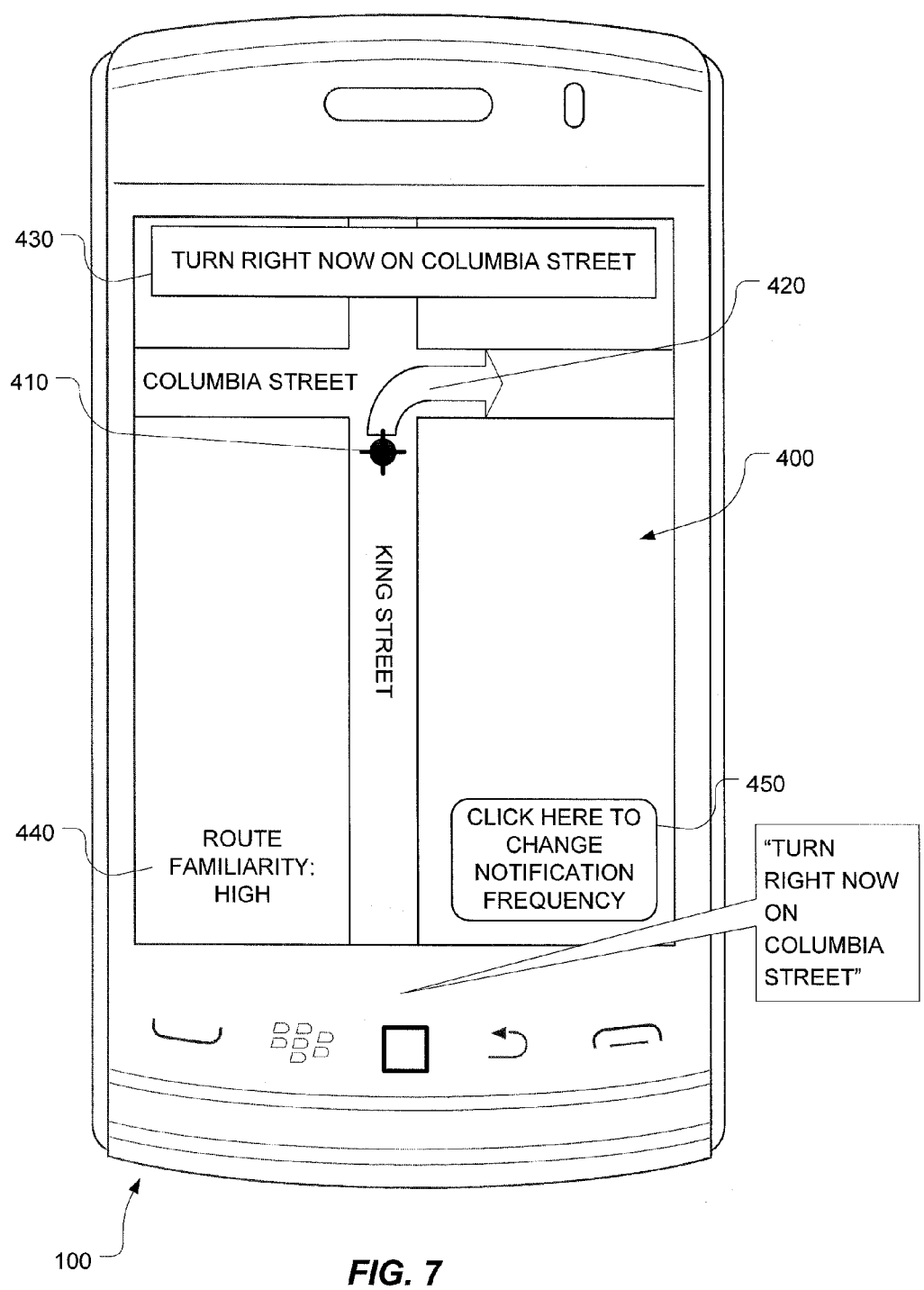
FIG. 7 depicts an example of a navigation application executing on a mobile device traveling along a familiar path in which case the device provides, by way of example, a final notification to make the turn.

FIG. 6 and FIG. 7 illustrate the operation of the mobile device 100 when traveling along a familiar path. In this case, the device decreases the navigational notifications and thus provides only minimal instructions to the user.

For example, as shown in FIG. 6, the device may provide only one advance notification of an upcoming turn onto Columbia Street. In this particular example, this notification is provided 100 meters before the turn. It will be appreciated that this distance is strictly provided as an example, and the notification distances and/or times are a matter of design choice and thus may be varied.

FIG. 7 depicts, by way of example, the mobile device providing a final notification to make the turn.

Thus, when navigating along familiar paths (or when situated in familiar territory), the device may for example provide only two audible instructions, one as advance warning and a second when the intersection has been reached.

Figure 8:
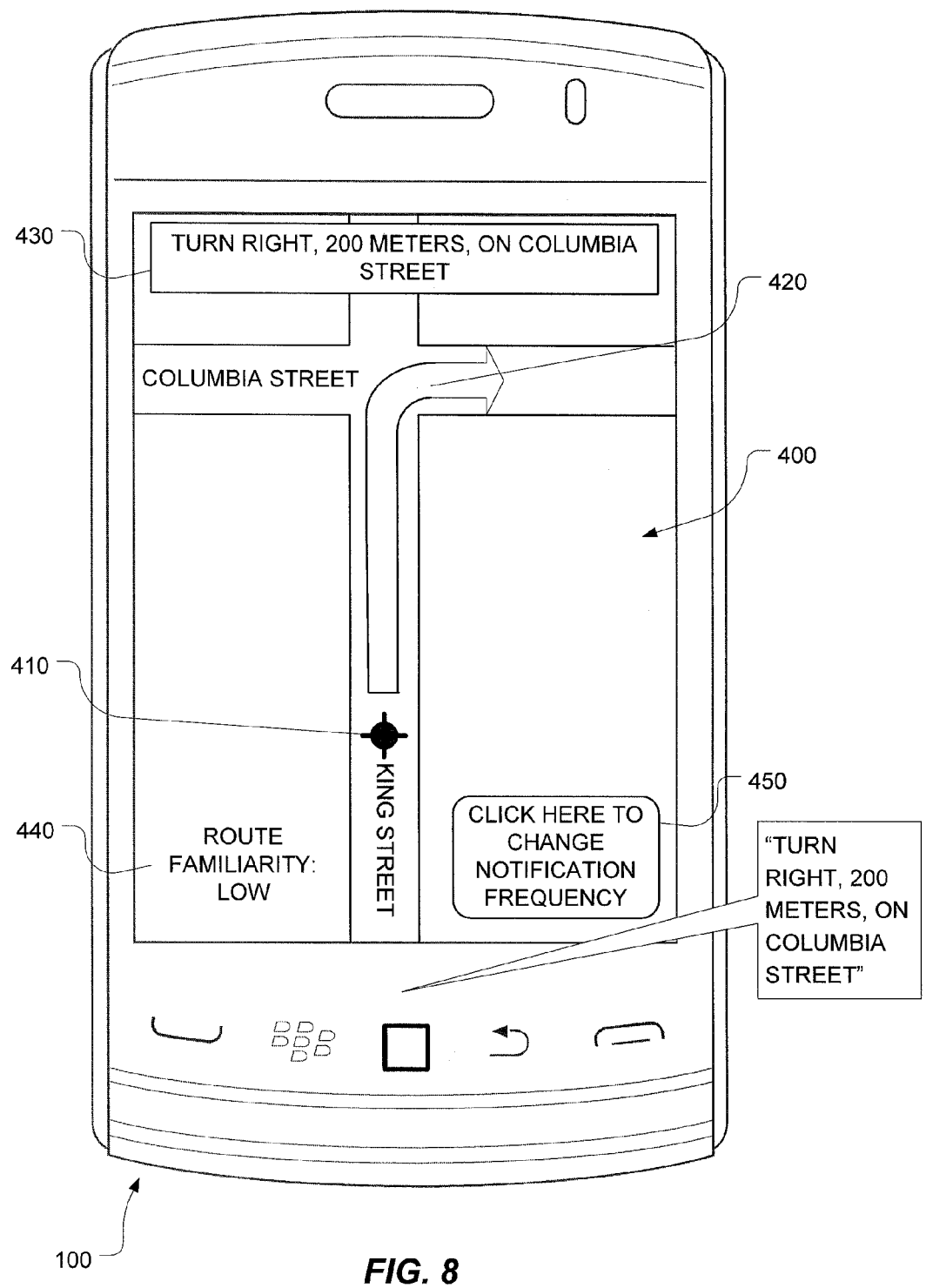
FIG. 8 depicts an example of a navigation application executing on a mobile device traveling along an unfamiliar path in which case the device provides, by way of example, a first advance notification of an upcoming turn.
Figure 9:
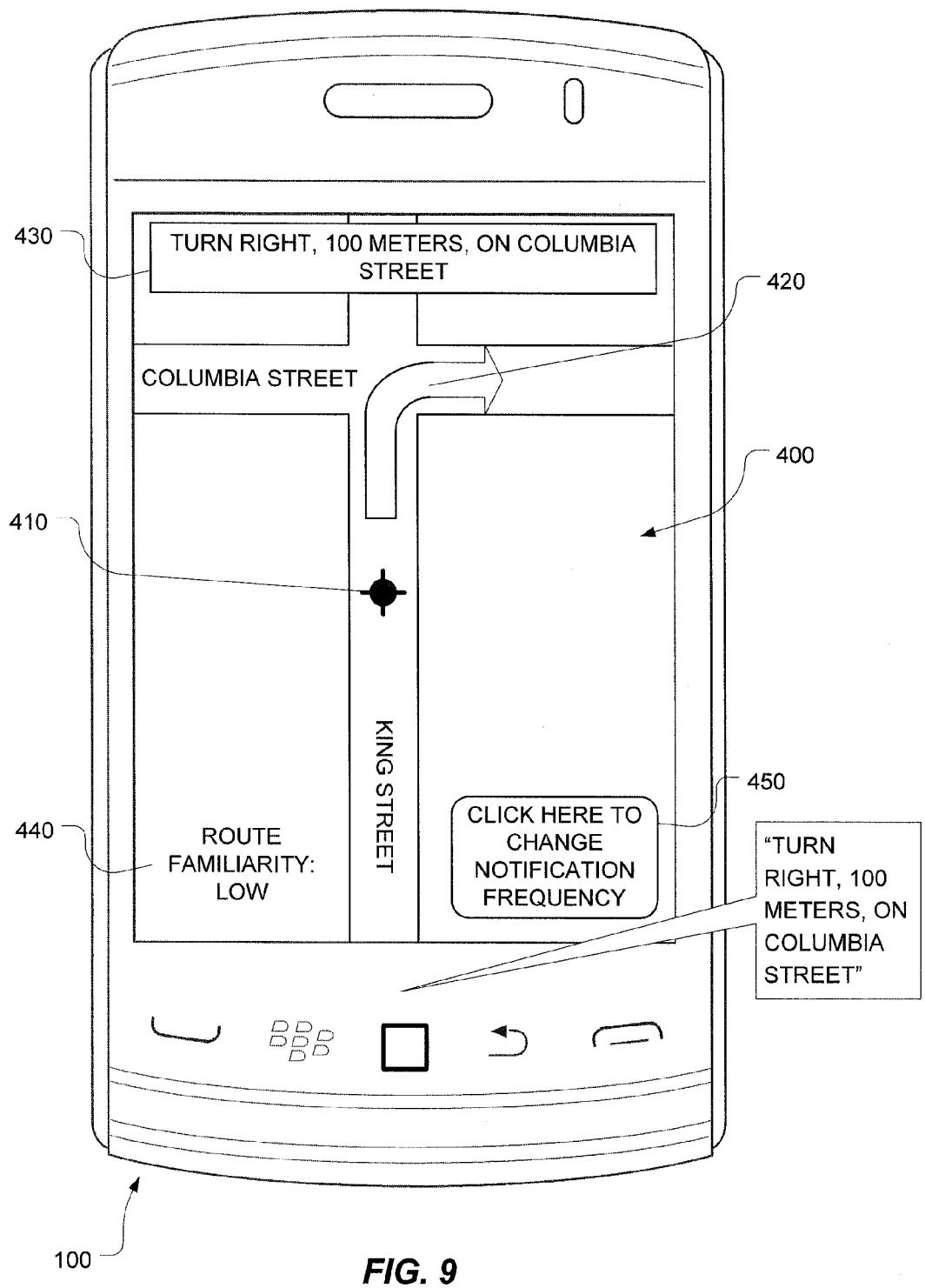
FIG. 9 depicts an example of a navigation application executing on a mobile device traveling along an unfamiliar path in which case the device provides, by way of example, a second advance notification of an upcoming turn.
Figure 10:
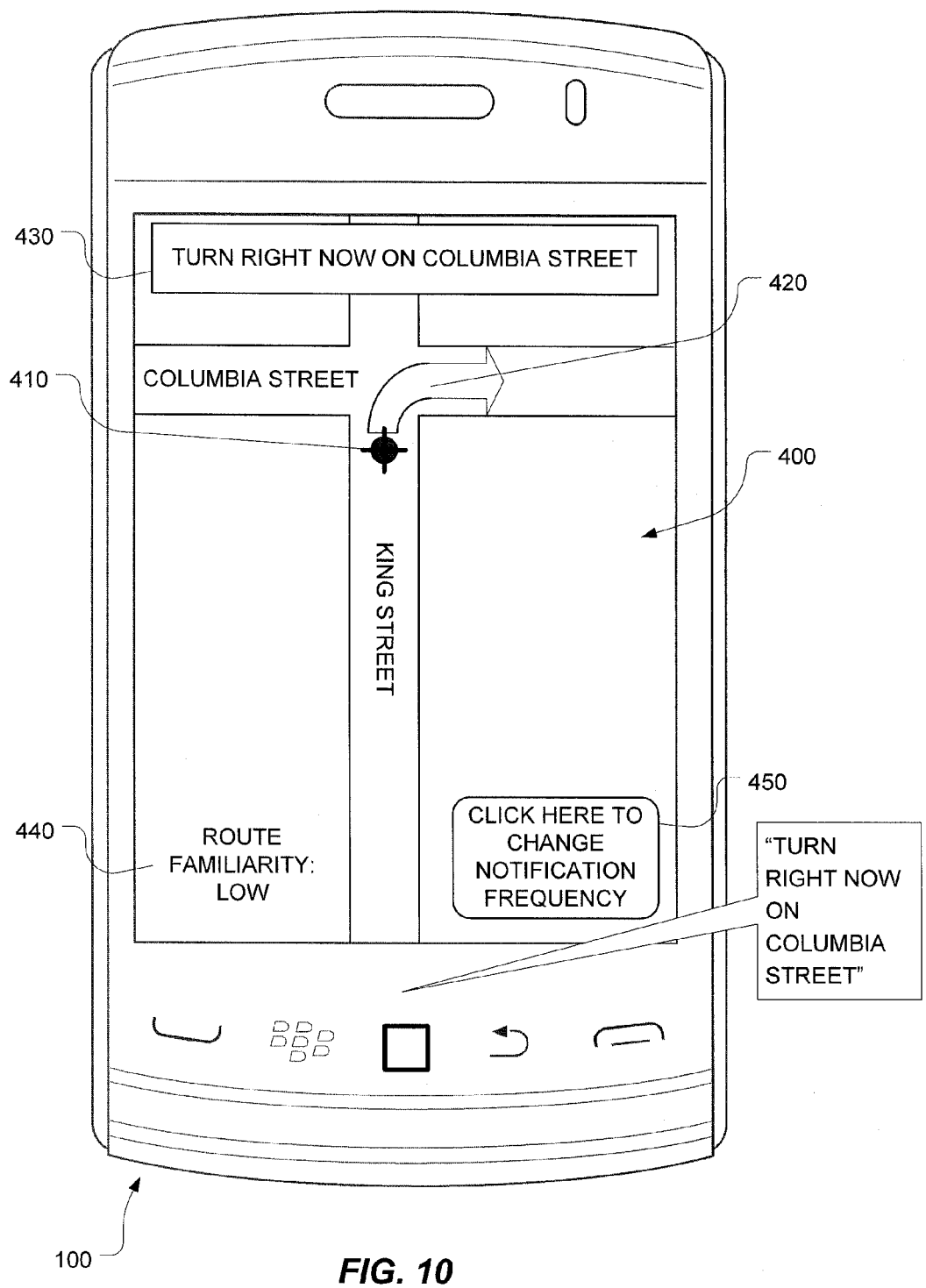
FIG. 10 depicts an example of a navigation application executing on a mobile device traveling along an unfamiliar path in which case the device provides, by way of example, a final notification to make the turn.

In contrast, as depicted in FIGS. 8-10, when navigating along unfamiliar paths or when situated in unfamiliar territory), the device may for example provide only three (or more) audible instructions, e.g. multiple advance warnings and a final turn instruction when the intersection has been reached. For example, as shown in FIG. 8, a first advance warning may be provided at 200 meters to prepare the user for the upcoming turn with which he is unfamiliar. As shown by way of example in FIG. 9, a second advance warning may be provided at 100 meters. As shown by way of example in FIG. 10, a final instruction is provided when the intersection is reached. As will be appreciated, the precise number of notifications and when (or where) they are delivered is a matter of design choice and thus may be varied.

Figure 11:
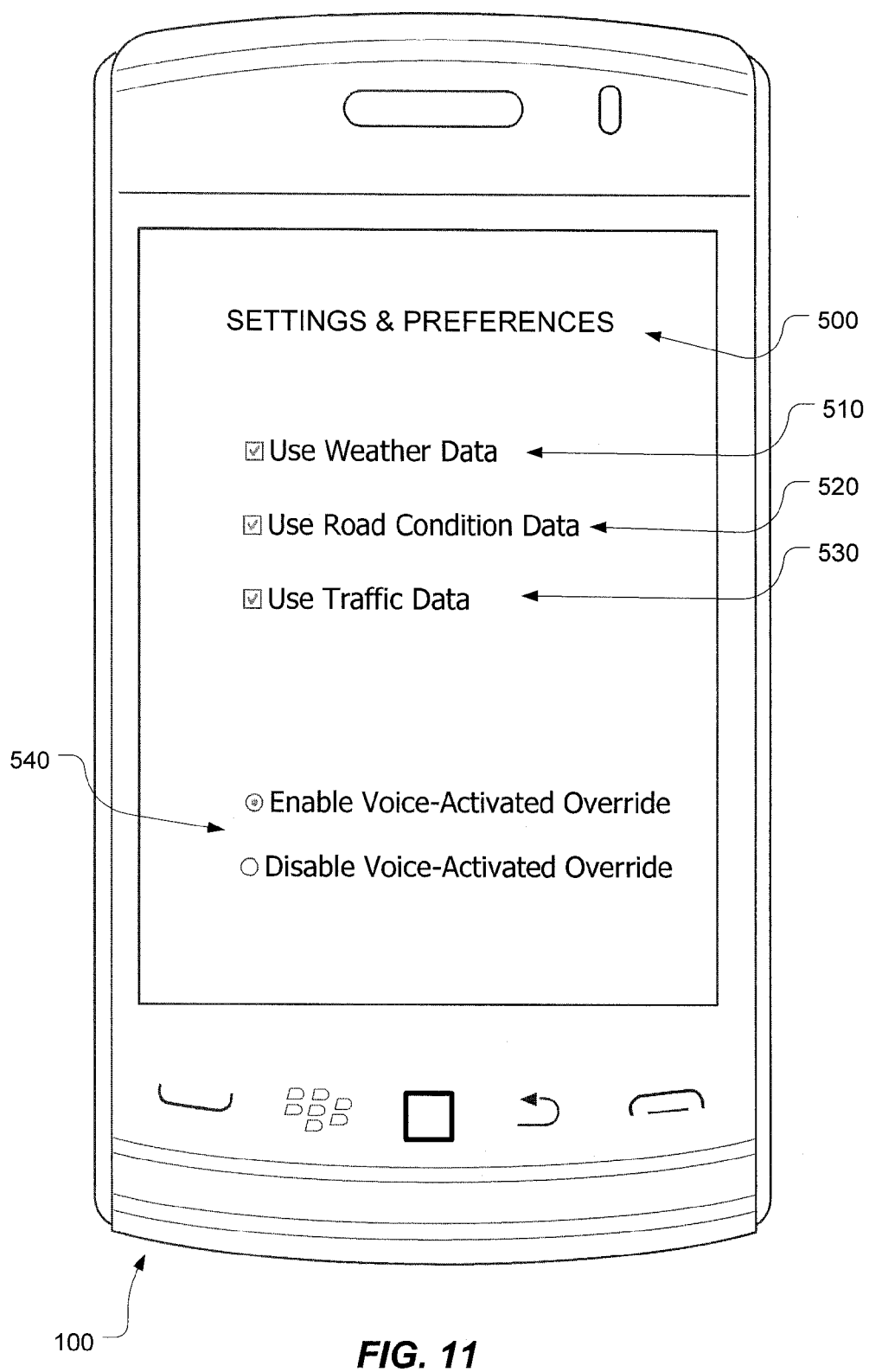
FIG. 11 depicts a setting and preference page (or menu) in the navigation application that enables the user to configure the manner in which the frequency of notifications is varied.

FIG. 11 depicts an example of a settings and preferences page 500 (or menu) in the navigation application that enables the user to configure the manner in which the frequency of notifications is varied. For example, the settings and preferences page 500 may include a check box 510 for obtaining and/or using weather data to further adjust or refine the notification frequency. For example, the settings and preferences page 500 may also include a check box 520 for obtaining and/or using road condition data to further adjust or refine the notification frequency. For example, the settings and preferences page 500 may further include a check box 530 for obtaining and/or using traffic data to further adjust or refine the notification frequency.

The setting and preference page 500 may optionally include a toggle 540 for switching between a first mode of operation in which the device permits a voice-activated override and a mode where it does not. In a voice-activated override mode, the user may speak voice commands to the device to increase or decrease the frequency of the notifications.

This new technology has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A method of providing navigational notifications, the method comprising:
   identifying a current route;
   determining whether the current route is a familiar path comprising:
   storing a list of route segments over which a device has traveled;
   storing a number of times the device has traveled each of the route segments;
   storing dates when the route segments were traveled;
   computing a route familiarity quotient based on the number of times a route segment was traveled and how long ago the route segment was traveled;
   comparing the route familiarity quotient to a predetermined threshold to determine whether the route is to be classified as familiar; and
   varying a frequency of the navigational notifications based on whether the current route is a familiar path and also based on one or more of weather data, road condition data and traffic data, wherein the one or more of the weather data, road condition data and traffic data are received wirelessly by a radiofrequency transceiver of the device.

2. The method as claimed in claim 1 wherein determining whether the current route is a familiar path further comprises determining whether the device is located in a familiar geographical area.

3. The method as claimed in claim 1 further comprising adjusting the frequency of the navigational notifications based only on familiarity and the weather data.

4. The method as claimed in claim 1 further comprising adjusting the frequency of the navigational notifications based only on familiarity and the road condition data.

5. The method as claimed in claim 1 further comprising adjusting the frequency of the navigational notifications based only on familiarity and the traffic data.

6. The method as claimed in claim 1 further comprising:
   receiving a voice command;
   adjusting the frequency of the navigational notifications based on the voice command.

7. The method as claimed in claim 1 further comprising adjusting the frequency of navigational notifications based on whether a current time of day is daytime or night-time.

8. A non-transitory computer-readable medium comprising instructions in code which when loaded into memory and executed on a processor of a GPS-enabled navigation device is adapted to perform acts of:
   identifying a current route;
   determining whether the current route is a familiar path comprising:
   storing a list of route segments over which the device has traveled;
   storing a number of times the device has traveled each of the route segments;
   storing dates when the route segments were traveled;
   computing a route familiarity quotient based on the number of times a route segment was traveled and how long ago the route segment was traveled;
   comparing the route familiarity quotient to a predetermined threshold to determine whether the route is to be classified as familiar; and
   varying a frequency of the navigational notifications based on whether the current route is a familiar path and also based on one or more of weather data, road condition data and traffic data, wherein the one or more of the weather data, road condition data and traffic data are received wirelessly by a radiofrequency transceiver of the device.

9. The computer readable medium as claimed in claim 8 wherein the code is configured to cause the device to adjust the frequency of the navigational notifications based only on familiarity and the weather data.

10. The computer readable medium as claimed in claim 8 wherein the code is configured to cause the device to adjust the frequency of the navigational notifications based only on familiarity and the traffic data.

11. The computer readable medium as claimed in claim 8 wherein the code is configured to cause the device to adjust the frequency of the navigational notifications based only on familiarity and the road condition data.

12. The computer-readable medium as claimed in claim 8 further comprising code to cause the device to further adjust the frequency of navigational notifications based on whether a current time of day is daytime or night-time.

13. A navigation-enabled device comprising:
   a memory operatively coupled to a processor for executing a navigation application;
   a speaker operatively coupled to the processor for providing navigational notifications;
   a position-determining system for determining a current location to enable the processor to identify a current route on which the device is located; and
   wherein the processor is configured to:
   determine whether the current route is a familiar path by:
   storing in the memory a list of route segments over which the device has traveled;
   storing in the memory a number of times the device has traveled each of the route segments;
   storing in the memory dates when the route segments were traveled;
   computing a route familiarity quotient based on the number of times a route segment was traveled and how long ago the route segment was traveled; and
   comparing the route familiarity quotient to a predetermined threshold to determine whether the route is to be classified as familiar; and
   vary a frequency of the navigational notifications based on whether the current route is a familiar path and also based on one or more of weather data, road condition data and traffic data, wherein the one or more of the weather data, road condition data and traffic data are received wirelessly by a radiofrequency transceiver of the device.

14. The device as claimed in claim 13 wherein the radiofrequency transceiver only receives the weather data, and wherein the processor is configured to adjust the frequency of the navigational notifications based on the weather data and familiarity.

15. The device as claimed in claim 13 wherein the radiofrequency transceiver only receives the road condition data, and wherein the processor is configured to adjust the frequency of the navigational notifications based on the road condition data and familiarity.

16. The device as claimed in claim 13 wherein the radiofrequency transceiver only receives traffic data, and wherein the processor is configured to adjust the frequency of the navigational notifications based on the traffic data and familiarity.

17. The device as claimed in claim 13 wherein the processor further adjusts the frequency of navigational notifications based on whether a current time of day is daytime or nighttime.

* * * * *